United States Patent
Deubler

(10) Patent No.: US 8,763,638 B2
(45) Date of Patent: Jul. 1, 2014

(54) CHECK VALVE

(71) Applicant: Duerr Dental AG, Bietigheim-Bissingen (DE)

(72) Inventor: Alfred Deubler, Freiberg (DE)

(73) Assignee: Duerr Dental AG (DE)

( * ) Notice: Subject to any disclaimer, the term of this patent is extended or adjusted under 35 U.S.C. 154(b) by 0 days.

(21) Appl. No.: 13/769,987

(22) Filed: Feb. 19, 2013

(65) Prior Publication Data

US 2013/0153039 A1  Jun. 20, 2013

Related U.S. Application Data

(63) Continuation of application No. PCT/EP2011/003861, filed on Aug. 2, 2011.

(30) Foreign Application Priority Data

Aug. 19, 2010 (DE) .......... 10 2010 034 867

(51) Int. Cl.
*F16K 31/40* (2006.01)
*F17D 1/04* (2006.01)
*F04B 49/08* (2006.01)

(52) U.S. Cl.
USPC .............. 137/565.14; 137/565.18; 251/30.05; 417/28; 417/44.2

(58) Field of Classification Search
USPC .......... 137/565.14, 565.18, 899.4; 251/30.02, 251/30.05, 34, 41; 417/26, 28, 44.2, 44.5, 417/44.6, 44.7, 44.8, 44.9
See application file for complete search history.

(56) References Cited

U.S. PATENT DOCUMENTS

| | | | | |
|---|---|---|---|---|
| 1,055,161 A | * | 3/1913 | Geissinger | 251/34 |
| 2,516,247 A | | 7/1950 | Nuenmann | |
| 4,312,376 A | | 1/1982 | Allen | |
| 4,779,836 A | * | 10/1988 | Marklund | 251/26 |
| 5,101,858 A | * | 4/1992 | Klotz | 251/34 |
| 6,457,696 B1 | * | 10/2002 | Hirota | 251/30.02 |
| 6,595,757 B2 | * | 7/2003 | Shen | 417/44.2 |

FOREIGN PATENT DOCUMENTS

| | | |
|---|---|---|
| GB | 190925123 | 9/1910 |
| GB | 2153973 | 8/1985 |

* cited by examiner

*Primary Examiner* — John Rivell
(74) *Attorney, Agent, or Firm* — Factor Intellectual Property Law Group, Ltd.

(57) ABSTRACT

A check valve comprising a valve housing, which comprises an inlet, an outlet, and a valve channel. The valve channel connects the inlet to the outlet and has a valve seat. The check valve further comprises a closure part, which cooperates with the valve seat, and a tappet bearing the closure part. An end of the tappet which is remote from the closure part bears a control piston, which together with a cylinder wall defines a control chamber, which is connected a control connection. The control chamber is connected to the valve channel by means of a connection channel.

13 Claims, 4 Drawing Sheets

CHECK VALVE

CROSS-REFERENCE TO RELATED APPLICATIONS

The present application is a continuation of International Application No. PCT/EP2011/003861, filed on Aug. 2, 2011, which claims priority to German Patent Application 10 2010 034 867.8 filed Aug. 19, 2010. The full disclosure of both of these earlier applications is incorporated herein by reference.

BACKGROUND OF THE INVENTION

1. Field of the Invention

The invention relates to a compressed-air supply unit, a check valve and to a method for operating a compressed-air supply unit.

2. Description of Related Art

A compressed-air supply unit, which is used for example in a dental-medical workplace for providing compressed air, has a pressure accumulator which is filled with the aid of a compressor. When compressed air is withdrawn from the pressure accumulator, the pressure of the air contained in the pressure accumulator falls, so that when the pressure falls below a presettable minimum pressure a manometric switch connected to the pressure accumulator starts the compressor, in order to fill the pressure accumulator again.

Between the pressure accumulator and the compressor, there is provided a check valve, which when the compressor is switched off prevents the compressed air from escaping from the pressure accumulator in the direction opposite the conveying direction of the compressor.

Check valves known hitherto comprise, for this purpose, closing parts which are pressed against a valve seat with the aid of a spring. As soon as the pressure applied to the closing part on the inlet side exceeds the spring force, the check valve opens and the air can be conveyed by the compressor to the pressure accumulator.

A construction of this type constitutes a spring-mass system exhibiting a natural oscillation behaviour which can be excited to oscillate by pressure fluctuations in the air flow. In particular, piston compressors frequently generate an air flow which pulsates with greater or lesser intensity with the rotational frequency of the drive motor, so that the closing part of the check valve during the operation of the compressor hammers on the valve seat with greater or lesser intensity depending on the pressure applied, which may result in disturbing noise generation. This is undesirable in particular when using the compressed-air supply unit in a patient environment as in the case of a dental-medical workplace.

SUMMARY OF THE INVENTION

It is therefore an object of the invention to provide a compressed-air supply unit in which the noise generation is reduced.

It is further an object of the invention to provide a check valve for such a compressed-air supply unit.

It is further an object of the invention to provide a method for operating a compressed-air supply unit, in which the noise generation is reduced.

These objects may be achieved by a compressed-air supply unit comprising a compressor, a pressure accumulator, a vent valve and a check valve. In particular the check valve comprises a valve housing, which has an inlet connected to the compressor, an outlet connected to the pressure accumulator and a valve channel. The latter comprises a valve seat and connects the inlet to the outlet. The check valve further comprises a closing part, which cooperates with the valve seat, and a tappet, which bears the closing part. And an end of the tappet which is remote from the closing part bears a control piston. The control piston, together with a cylinder wall, delimits a control chamber, which is in fluid communication with a control connection, the control connection being connected to the vent valve. The control chamber is connected to the valve channel via a connecting channel enabling a fluid communication between the control chamber and the valve channel.

The check valve of the compressed-air supply unit is a self-actuated controllable check valve, in which the closing part can be moved to and fro bistably with the aid of the control piston between two different positions.

If the pressure in the valve channel increases on the inlet side, for example, by switching on an upstream compressor, the medium, mostly compressed air, passing through the check valve enters the control chamber via the connecting channel. A force then acting on the cap end side on the control piston moves the closing part necessarily into an open position. The cross-section of the connecting channel may be chosen here to be so small that the pressure in the control chamber remains largely constant despite the pressure fluctuations at the inlet of the check valve, so that the closing part remains in the open position.

A further advantage of the check valve relates to the venting of the pressure line. To be precise, the components and connecting lines lying between check valve and outlet of the compressor are forced-vented when the compressor is switched off, in order to enable the compressor to start well when it is switched on again.

In the check valve according to the invention, the venting at the check valve can be effected via the control connection and the control chamber. By venting the control chamber, the closing part closes, with pressure forces still applied to the end face of the control piston remote from the control chamber guaranteeing a reliable closing of the closing part.

A noise generation thus occurs, according to the invention, only once on the opening and once on the closing of the valve.

In an embodiment the control piston communicates, by its tappet-side end face, with the valve channel.

As a result of the fact that the control piston is subjected, on the side remote from the control chamber, to the pressure applied to the valve channel on the inlet side, the closing part is necessarily closed, as soon as the control chamber is vented. The relatively small cross-section of the connecting channel acts here as a throttle, so that the pressure in the control chamber drops more rapidly than in the valve channel.

In an embodiment the connecting channel has a backflow barrier, which prevents a backflow of medium from the control chamber into the valve channel.

After a venting of the control chamber, ambient air under corresponding ambient air pressure is present therein. The backflow barrier prevents this uncleaned or undried air from getting into the inside of the pressure accumulator. Furthermore, the backflow barrier prevents the medium from getting back into the valve channel owing to a pressure drop in the valve channel, which may occur, for example, after the opening of the closing part with respect to the pressure accumulator.

In an embodiment the connecting channel connects the control chamber to the valve channel via the control piston.

This represents a simple manufacturing possibility, since the connecting channel may be a simple bore through the control piston. By suitable choice of the diameter, the differential pressure decreasing along the connecting channel can be set so that a reliable closing of the check valve upon the venting of the control chamber is ensured.

In an embodiment the control connection is provided on a closing plug, which closes off the cylinder wall of the control chamber.

The inside of the check valve is accessible during production or for maintenance via the closing plug, which can be inserted as a separate component into the valve housing.

When using an angled control connection stub, the orientation of the control connection can be freely chosen by rotating the closing plug.

In an embodiment the valve seat comprises a circumferential, inclined bevel, preferably inclined at about 45°, on the valve channel, and the closing part comprises in a circumferential outer groove a sealing ring which cooperates with the bevel.

As a result, a leaktight soft closing of the check valve is ensured. For production purposes, it is advantageous when the closing part has smaller external dimensions than the internal dimension of the valve seat, so that the closing part can be pushed through the valve seat on the inlet side. After that, the sealing ring can be introduced into the outer groove, so that the closing part with the sealing ring works against the valve seat.

In an embodiment the bevel is provided on the front end of a hollow outlet stub.

If the outlet stub is provided with a thread, this stub serves simultaneously as a means for fastening to the pressure accumulator and as a valve seat, so that it is not necessary to form a special shoulder as a valve seat in the inside of the valve channel.

In an embodiment the valve housing is leak-tightly surrounded in an axial partial region by a hollow-cylindrical inlet housing part, which comprises the inlet and is rotatable relative to the valve housing.

A separately rotatable inlet housing part enables an orientation of the inlet, thus enabling flexible use of the check valve.

In an embodiment an outer surface of the valve housing has supporting shoulders which are stepped radially progressively inwards, a first supporting shoulder supporting the inlet housing part and a second supporting shoulder of the valve housing cooperating with a connection stub of a pressure accumulator.

If sealing rings are provided on the supporting shoulders, the supporting shoulders constitute a simple possibility of fastening the valve leak-tightly on the connection stub, for example, of a pressure accumulator and at the same time securing the inlet housing part.

With regard to the method, the objects may be achieved by a method for operating a compressed-air supply unit, comprising the following steps:
a) providing a compressor;
b) providing a pressure accumulator;
c) providing a vent valve;
d) providing a check valve which comprises:
   a valve housing, which has an inlet connected to the compressor, an outlet connected to the pressure accumulator and a valve channel, which comprises a valve seat and connects the inlet to the outlet,
   a closing part, which cooperates with the valve seat, and
   a tappet, which bears the closing part,
   wherein
   an end of the tappet which is remote from the closing part bears a control piston,
   the control piston, together with a cylinder wall, delimits a control chamber, which is connected with the vent valve via a control connection, and
   the control chamber is connected to the valve channel via a connecting channel enabling a fluid communication between the control chamber and the valve channel.
e) providing a manometric switch, which controls the compressor and the vent valve;
f) closing the vent valve when a pressure in the pressure accumulator falls below a minimum pressure and activating the compressor, so that via the connecting channel a pressure builds up in the control chamber of the check valve, which pressure opens the check valve towards the pressure accumulator;
g) opening the vent valve and deactivating the compressor when a desired pressure in the pressure accumulator is reached, so that the pressure in the control chamber of the check valve drops, whereby the check valve is closed.

Since the control connection of the self-actuated check valve is used at the same time for venting the pressure lines, the check valve is controllable by the manometric switch. A reliable quiet opening and closing of the valve is ensured here by virtue of the self-actuation, since pressure fluctuations produced by the compressor do not result in oscillation of the closing part. The compressed-air supply unit thus exhibits lower noise generation.

In an embodiment a drier is provided that is connected to the compressor and the check valve, which drier is likewise vented via the vent valve.

The drier dries the compressed air coming from the compressor, so that only dried and cleaned compressed air suitable for use in the dental-medical field is present in the pressure accumulator. As a result of the fact that the drier and the check valve at the pressure accumulator are vented via the same vent valve, no further vent valve needs to be provided at the manometric switch. Particularly advantageous in this regard is a backflow barrier in the connecting channel, since the venting valve also vents regions of the drier which contain moist air and therefore the backflow barrier must ensure that no moist air passes through the control connection via the connecting channel into the valve channel and thus into the pressure accumulator.

In an embodiment the manometric switch controls the vent valve as a function of signals of a pressure sensor, a time control and/or a rotational speed sensor.

It is thus possible, for example when starting the compressor, for the vent valve still to be open, and only when a specific rotational speed is reached or after a certain time, for the vent valve to be closed. If the rotational speed is not reached after a certain time, for example owing to a malfunction of the compressor, the manometric switch can keep the vent valve open and switch off the compressor again.

It is to be understood that the aspects, objects, and embodiments of the present invention described above may be combinable and that other advantages and aspects of the present invention will become apparent upon reading the following description of the drawings and detailed description of the invention.

BRIEF DESCRIPTION OF THE DRAWINGS

The invention is explained in more detail below by exemplary embodiments with reference to the drawings, in which.

DETAILED DESCRIPTION OF PREFERRED EMBODIMENTS

Figure 1:
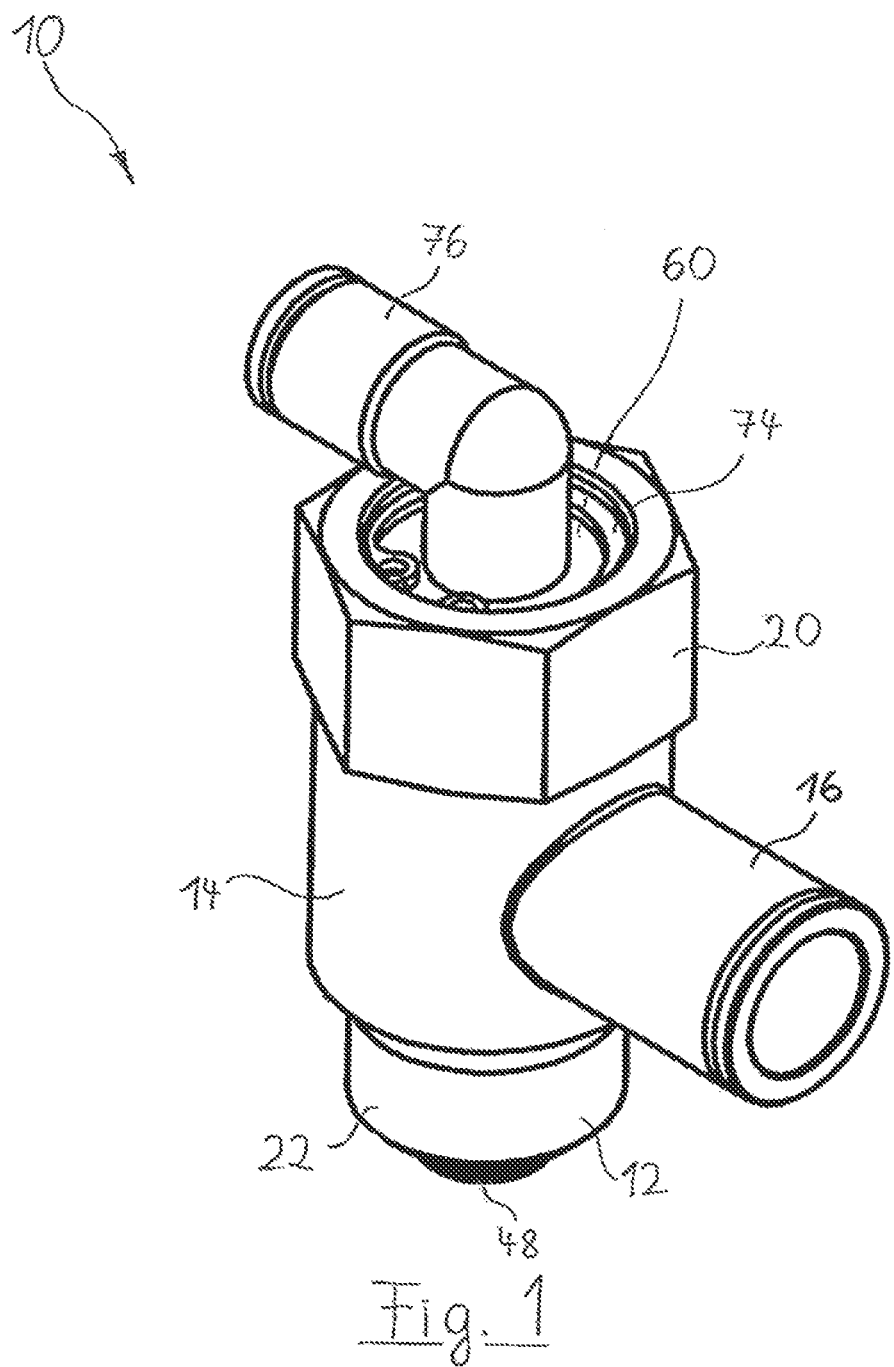
FIG. 1 shows a perspective view of a self-actuated check valve.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

FIG. 1 shows a check valve, designated as a whole by 10, with a valve housing 12 which rotatably bears an inlet housing part 14, on which is provided a radially outwardly pointing pipe stub 16 constituting the inlet for the check valve 10.

The valve housing 12 has a substantially hollow-cylindrical shape defining a valve channel 18 and has, at its end situated at the top in the drawing, a hexagonal section 20 serving as a screw-in aid.

Starting from the hexagonal section 20, the valve housing 12 narrows via two shoulders towards a threaded stub 22 forming the outlet of the check valve 10. The threaded stub 22 is screwed by an external thread 24 into a connection stub 26 of a pressure accumulator 28, as can be seen from FIG. 2.

On the valve housing 12 is provided a first radially inwardly stepped shoulder 30, at which begins a narrowed middle section 32 surrounded by the hollow-cylindrical inlet housing part 14. On the middle section 32, close to the shoulder 30, is provided a circumferential outer groove 34, in which a sealing ring 36 is arranged, so that the inlet housing part 14 can be supported on the shoulder 30 and at the same time leaktightly received.

A second radially inwardly stepped shoulder 38 is provided as a transition from the middle section 32 to the threaded stub 22. On this second shoulder 38 bears a further sealing ring 40, which, when the check valve 10 is being screwed in, is compressed to such a degree that the inlet housing part 14 is clamped between the first shoulder 30 and the connection stub 26 of the pressure accumulator 28 and the valve housing 12 is sealed off towards the surroundings.

The pipe stub 16 of the inlet housing part 14 is in connection with a circumferential inner groove 42, running round the inside of the inlet housing part 14 and communicating with the valve channel 18 via radial bores 44 in the middle section 32. As a result, a fluidic connection from the pipe stub 16 to the valve channel 18 in every rotary position of the inlet housing part 14 with respect to the valve housing 12 is ensured.

In a further exemplary embodiment (not shown), an outer groove connecting the radial bores 44 is provided in the middle section 32 of the valve housing 12, instead of or in addition to the inner groove 42 of the inlet housing part.

In the inside of the valve housing 12 is arranged a displaceable control element 46, comprising a closing part 48, a tappet 50 and a control piston 52. The control element 46 is arranged in the valve channel 18 in such a way that the closing part 48 projects out of the threaded stub 22 and thus into the pressure accumulator 28. On the closing part 48 there is further provided a circumferential outer groove 54, into which is inserted, after introduction of the control element 46 into the inside of the valve housing 12, a valve sealing ring 56 protruding radially from the outer groove 54 and cooperating with the end section of the threaded stub 22 as the valve seat. For this purpose, the threaded stub 22 has on the end side a 45° inwardly and upwardly inclined circumferential bevel 58.

Starting from the closing part 48, the tappet 50 points into the valve channel 18 and bears, at its end remote from the closing part 48, the control piston 52 which, together with a cylindrical inner wall of the valve housing 12 and a closing plug 62, delimits a control chamber 62.

A leaktight reception of the control piston 52 in the cylindrical wall is ensured by a lip seal 64, running around the control piston 52, in a circumferential groove of the control piston 52.

The control piston 52 further has on its end side a sunken bore 66, at the base of which is provided a throttle bore 68 with a small diameter. A transverse passage 69 in an upper head of the tappet 50 forms, together with the throttle bore 68, a connecting channel between the valve channel 18 and the control chamber 62.

The bottom of the sunken bore 66 is covered by a valve disc 70 which is held with an axial clearance above the throttle bore 68 with the aid of a radially preloaded slotted fixing ring 72. The valve disc 70 forms, together with the bottom of the sunken bore 66, a check valve opening in the direction towards the control chamber, that is to say a barrier which prevents a backflow of fluid in the opposite direction (towards the valve channel).

Figure 2:
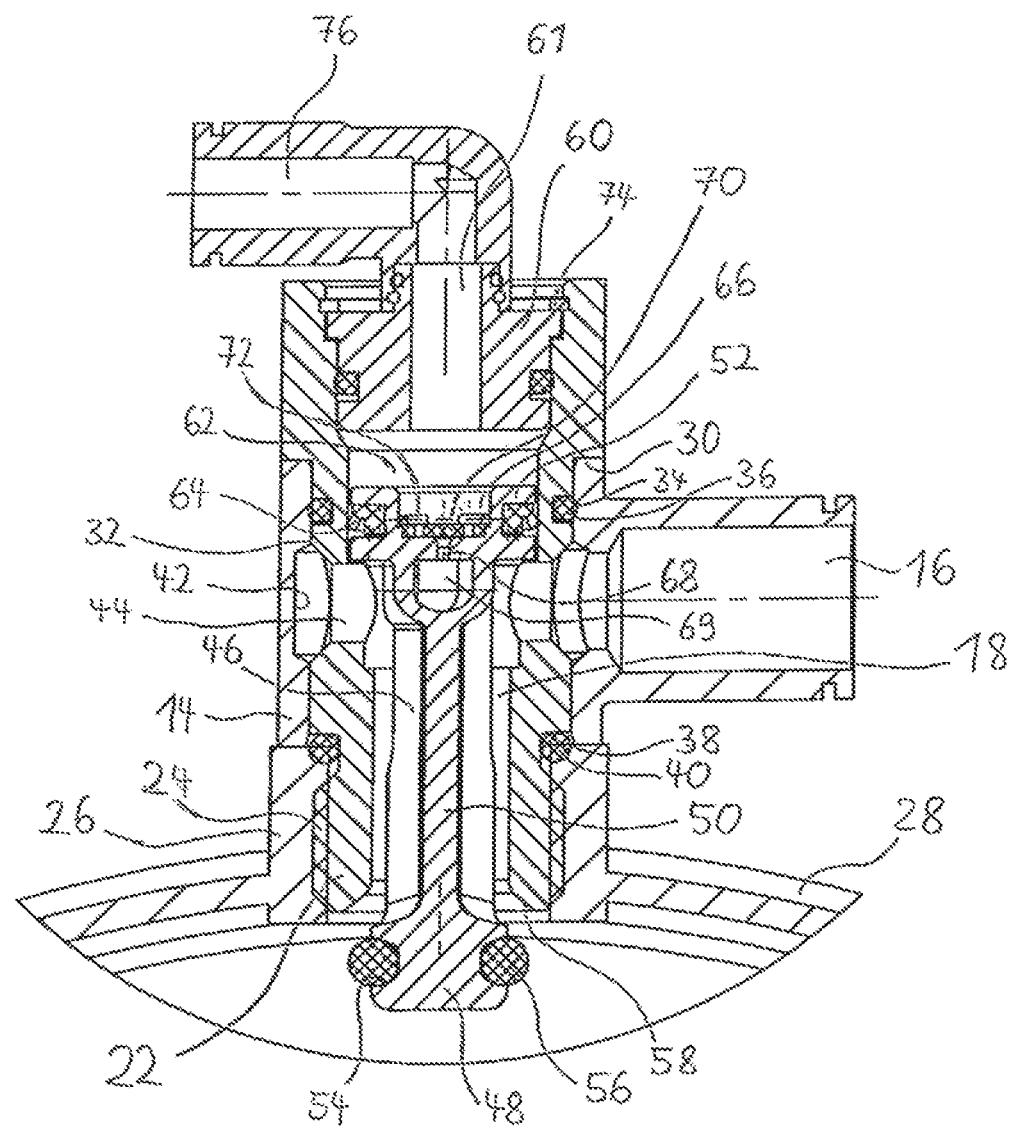
FIG. 2 shows a longitudinal section through the check valve, connected to a pressure accumulator, in the open state.

The closing plug 60, which is likewise axially secured by a radial spring ring 74, has at the centre a bore 61 which is in connection with a pilot valve (not illustrated here) via a control connection stub 76, which is illustrated angled in FIG. 2, but may also be of straight design.

Figure 3:
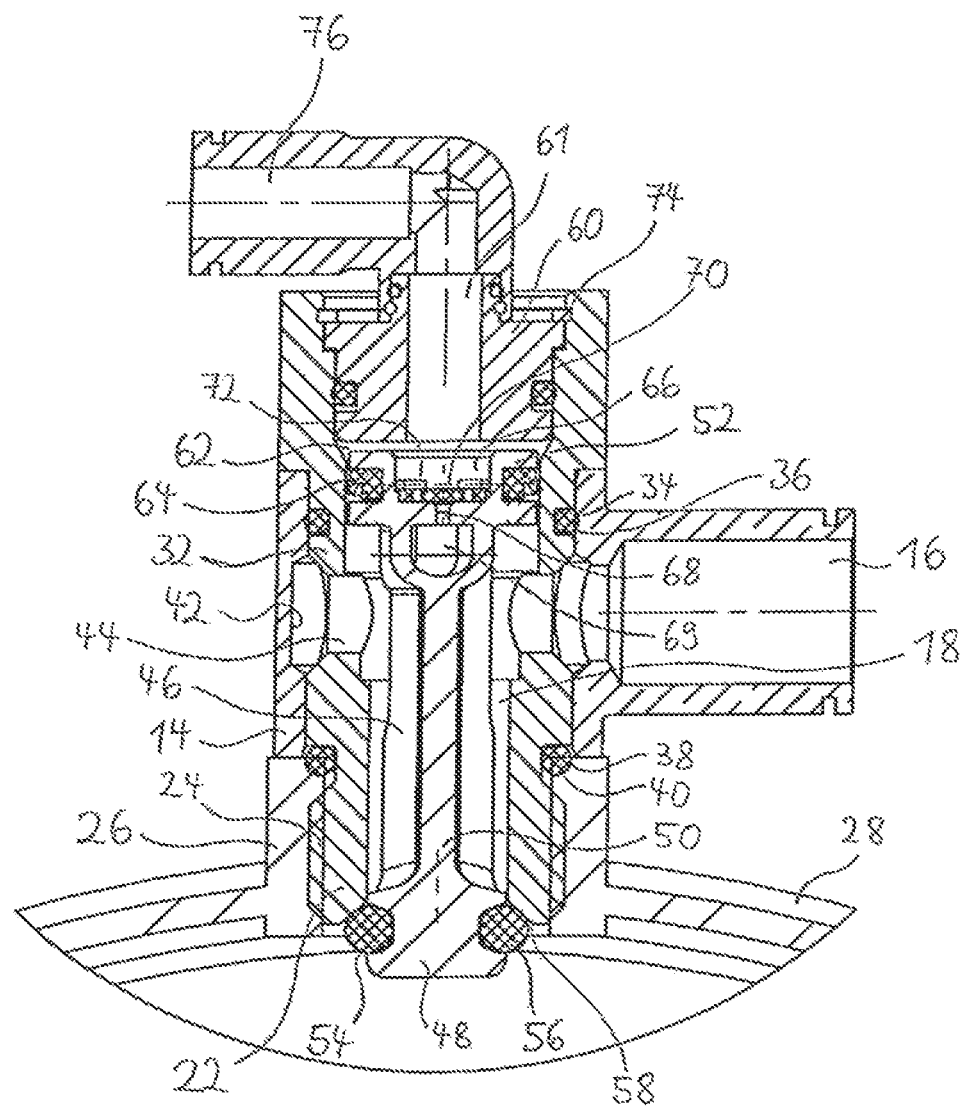
FIG. 3 shows a longitudinal section through the check valve, connected to a pressure accumulator, in the closed state.

FIG. 3 shows the check valve 10 with the control element 46 in a closed position, in which the valve sealing ring 56 bears leaktightly on the oblique bevel 58.

Figure 4:
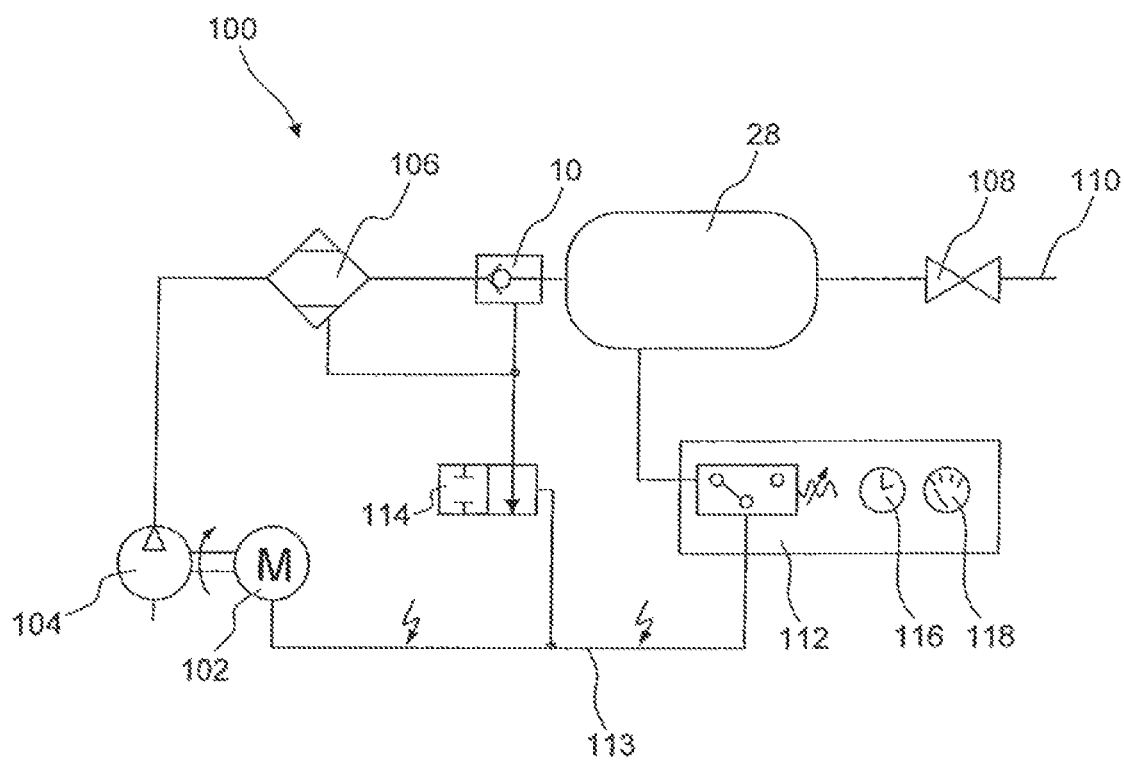
FIG. 4 shows a schematic fluid circuit diagram of a compressed-air supply unit.

FIG. 4 shows schematically the use of the check valve 10 in a compressed-air supply unit 100.

A compressor 104 driven by a motor 102 is connected to the pressure accumulator 28 via an air drier 106 and the check valve 10.

To the pressure accumulator 28 is connected a shut-off fitting 108, which is connected via a pressure line 110 to consumers (not shown).

A manometric switch with window 112 is connected to the pressure accumulator 28. This switch closes when the pressure falls below a lower desired pressure and opens when the pressure exceeds an upper desired pressure for the pressure accumulator 28 and thus controls the motor 102 via an electrical line 113 according to requirements. The manometric switch 112 also controls via the line 113 a vent valve 114, which is connected to the control connection stub 76 of the check valve 10 and to a vent connection of the air drier 106. The vent valve 114 can either be closed or opened towards the surroundings by the manometric switch 112.

To control the motor 102 and the vent valve 114, the manometric switch 112 can additionally use information of a timer 116 and a rotational speed sensor 118 which measures the rotational speed of the motor 102.

In the present exemplary embodiment, the vent valve 114 is actuated electromagnetically by an electromechanical manometric switch 112.

According to an exemplary embodiment (not shown), however, the manometric switch 112, may also actuate the vent valve directly mechanically. Furthermore, the manometric switch 112 may also be formed as an electronic control.

As can be seen from the exemplary embodiment shown, the check valve 10 does not comprise a spring acting on the closing part 48. According to an exemplary embodiment (not shown), however, a spring may also be provided in order to generate a preload of the closing part 48 according to the pressures present.

The compressed-air supply unit 100 works as follows:

The vent valve 114 is closed by the manometric switch 112 and the compressor 104 is started as soon as the pressure in the pressure accumulator 28 falls below the lower desired pressure. Via the inlet of the check valve 10, compressed air enters the valve channel 18 and, with the check valve 10 at first still closed, passes via the passage 69 in the control piston 52 and the throttle bore 68 into the control chamber 62, where a pressure builds up on account of the closed vent valve 114.

Since the control piston 52 has a smaller active pressure surface on the side of the valve channel 18 than at the control chamber 62, the control element 46 is moved into an open position in the direction of the pressure accumulator 28. Irrespective of any inlet-side pressure fluctuations that may occur, the closing part 48 necessarily remains reliably open due to the differential pressurisation.

When the upper desired pressure in the pressure accumulator 28 is reached, the manometric switch 112 opens the vent valve 114 and stops the compressor 104. The opening of the vent valve 114 results in a rapid pressure drop in the control chamber 62, since the throttle bore 68 limits the fluid supply. As a result, the force acting upwardly in the closing direction on the control piston 52 predominates, and the control element 46 is moved into a closing position, in which the closing part 48 bears with the valve sealing ring 56 on the oblique bevel 58 and thus closes the check valve 10.

As a result of the valve sealing ring 56 on the closing part 48, the closing of the check valve 10 is almost inaudible. An audible switching noise upon opening that may be desired can be reduced by suitable damping elements, given a change of interest.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A compressed-air supply unit comprising:
   a compressor,
   a pressure accumulator,
   a vent valve and
   a check valve comprising
   a valve housing, which has an inlet connected to the compressor, an outlet connected to the pressure accumulator and a valve channel, which comprises a valve seat and connects the inlet to the outlet,
   a closing part, which cooperates with the valve seat, and
   a tappet, which bears the closing part,
   wherein
   an end of the tappet, which is remote from the closing part, bears a control piston,
   the control piston, together with a cylinder wall, delimits a control chamber, which is connected with the vent valve via a control connection, and
   the control chamber is connected to the valve channel via a connecting channel enabling a fluid communication between the control chamber and the valve channel.

2. The compressed-air supply unit according to claim 1, wherein a cross-section of the connecting channel is configured such that during venting via the vent valve a pressure in the control chamber drops faster than a pressure in the valve channel, resulting in a closing force acting on the control element of the check valve.

3. The compressed-air supply unit according to claim 1, wherein the control piston of the check valve has a tappet-side end face which is in fluid communication with the valve channel.

4. The compressed-air supply unit according to claim 1, wherein the connecting channel of the check valve has a backflow barrier, which prevents a backflow of a fluid from the control chamber into the valve channel.

5. The compressed-air supply unit according to claim 1, wherein the connecting channel of the check valve connects the control chamber to the valve channel via the control piston.

6. The compressed-air supply unit according to claim 1, wherein the control connection of the check valve terminates in a closing plug, which delimits one end of the control chamber.

7. The compressed-air supply unit according to claim 1, wherein the valve seat of the check valve comprises a circumferential, inclined bevel on the valve channel, and the closing part comprises a sealing ring which cooperates with the bevel and which is received in a circumferential outer groove provided in the closing part.

8. The compressed-air supply unit according to claim 7, wherein the bevel is provided on a front end of a hollow outlet stub of the check valve.

9. The compressed-air supply unit according to claim 1, wherein the valve housing of the check valve comprises an inner housing part and a hollow-cylindrical inlet housing part, wherein the inner housing part is leak-tightly surrounded in an axial partial region by the hollow-cylindrical inlet housing part, which comprises the inlet and is rotatable relative to the inner housing part.

10. The compressed-air supply unit according to claim 9, wherein an outer surface of the inner housing part has supporting shoulders which are stepped radially progressively inwards, a first supporting shoulder supporting the inlet housing part, and a second supporting shoulder of the inner housing part cooperating with a connection stub of the pressure accumulator.

11. A method for operating a compressed-air supply unit, comprising the following steps:
   providing a compressor;
   providing a pressure accumulator;
   providing a vent valve;
   providing a check valve which comprises:
   a valve housing, which has an inlet connected to the compressor, an outlet connected to the pressure accumulator and a valve channel, which comprises a valve seat and connects the inlet to the outlet,
   a closing part, which cooperates with the valve seat, and
   a tappet, which bears the closing part,
   wherein
   an end of the tappet which is remote from the closing part bears a control piston,
   the control piston, together with a cylinder wall, delimits a control chamber, which is connected with the vent valve via a control connection, and
   the control chamber is connected to the valve channel via a connecting channel enabling a fluid communication between the control chamber and the valve channel; and,
   providing a manometric switch, which controls the compressor and the vent valve;

closing the vent valve when a pressure in the pressure accumulator falls below a minimum pressure and activating the compressor, so that via the connecting channel a pressure builds up in the control chamber of the check valve, which pressure opens the check valve towards the pressure accumulator;

opening the vent valve and deactivating the compressor when a desired pressure in the pressure accumulator is reached, so that the pressure in the control chamber of the check valve drops, whereby the check valve is closed.

12. The method according to claim 11, wherein a drier is connected to the compressor and to the check valve, which drier is vented via the vent valve.

13. The method according to claim 11, wherein the manometric switch controls the vent valve as a function of signals provided by a pressure sensor, a time control and/or a rotational speed sensor.

* * * * *